C. A. MATHENY.
LAND DRAG.
APPLICATION FILED APR. 10, 1919.
1,379,033.
Patented May 24, 1921.
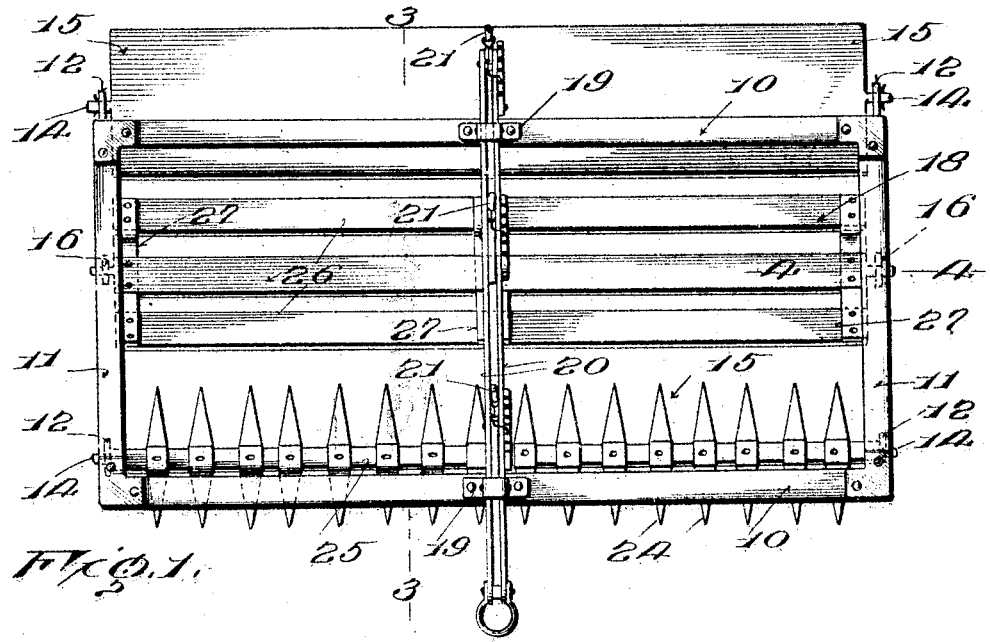
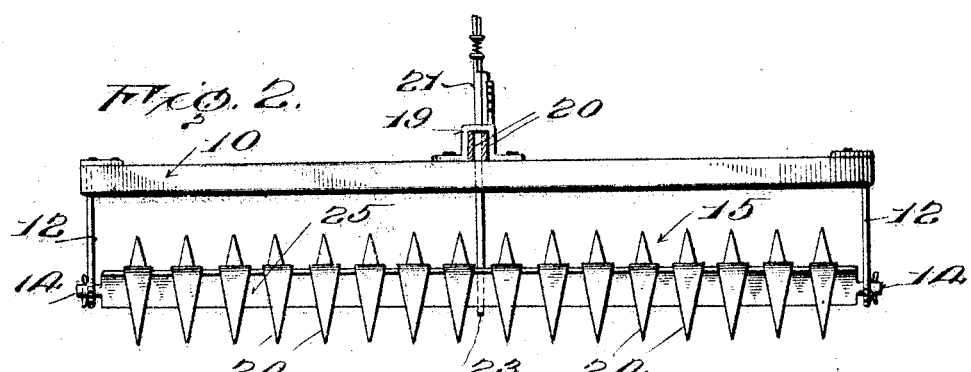
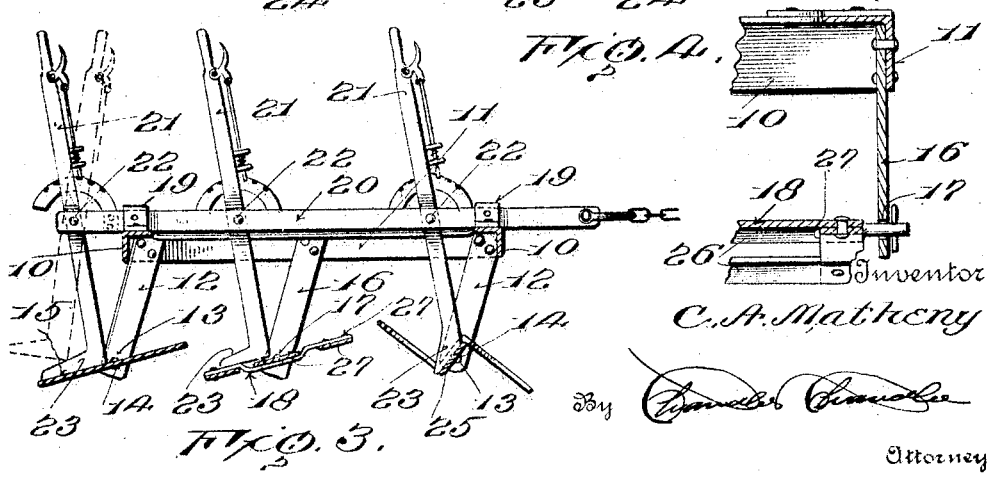
Inventor
C. A. Matheny
By
Attorneys

UNITED STATES PATENT OFFICE.

CHARLES A. MATHENY, OF KINGSTON, TENNESSEE.

LAND-DRAG.

1,379,033.  Specification of Letters Patent.  Patented May 24, 1921.

Application filed April 10, 1919. Serial No. 289,082.

*To all whom it may concern:*

Be it known that I, CHARLES A. MATHENY, a citizen of the United States, residing at Kingston, in the county of Roane, State of Tennessee, have invented certain new and useful Improvements in Land-Drags; and I do hereby declare the following to be a full, clear, and exact description of the invention, such as will enable others skilled in the art to which it appertains to make and use the same.

This invention relates to new and useful improvements in agricultural machines and particularly to clod crushers or land drags.

One object of the present invention is to provide a novel and improved structure wherein the ground treating elements are capable of being held against rotation at the will of the driver.

Another object is to provide a novel and improved device of the character named wherein the ground treating elements are arranged under the control of the driver so that he can release them when they become clogged, thereby permitting said elements to rotate freely and discharge the collection of clods and trash picked up by said elements.

Other objects and advantages will be apparent from the following description when taken in connection with the accompanying drawing.

In the drawing:

Figure 1 is a top plan view of a land drag made in accordance with my invention.

Fig. 2 is a front elevation of the same, the ground treating elements being shown as held against rotation.

Fig. 3 is a vertical sectional view taken on the line 3—3 of Fig. 1 showing the ground treating devices held against rotation, the holding levers being shown in dotted lines in their position when disengaged from the ground treating elements.

Fig. 4 is a vertical sectional view taken on the line 4—4 of Fig. 1.

Referring particularly to the accompanying drawing, there is shown a rectangular frame formed of the longer front and rear angle members 10, and the shorter end angle members 11, which latter are connected to the ends of the members 10. Depending from the four corners of the frame, and rigidly secured thereto, are the brackets 12, the lower ends of which are formed with the openings 13 for the reception of the trunnions 14 of the ground treating elements 15. These elements extend the entire width of the frame, as shown. Rigidly secured to the intermediate portions of the end members 11 of the frame, and depending therefrom, are the brackets 16, each having an opening 17 in its lower end for the reception of a trunnion of another ground treating element 18. Brackets 19 are secured to the intermediate portions of the front and rear members 10, and carried by these brackets, and extending forwardly and rearwardly on said members 10, are the lever supporting bars 20. Disposed between these bars are the levers 21 which are adapted to hold the ground treating devices against rotation. Each of these levers is pivotally supported between these bars 20, as shown at 22, and each has a forwardly and rearwardly extending right angular foot 23 which is adapted to be moved into position to rest on the upper face of the ground treating element to hold the same against rotation in the brackets 12 and 16. When it is desired to permit the elements to rotate to rid them of the accumulated trash, the levers are swung on their pivots so as to remove the feet thereof from engagement with the said elements, whereby said elements will be free to rotate in the brackets 12 and 16, by contact with the ground.

In the drawing there are shown three different types of ground treating devices, but it is to be understood that when the device is in use, there will be three of one type used on the machine at the same time, the others being provided to replace the former ones upon the change of conditions of the soil being worked.

The foremost one of the ground treating elements here shown comprises a flat bar to which are secured the double pointed tangs or teeth 24, each of said tangs having its ends turned upwardly and downwardly, respectively, as shown in the drawing. The foot of the lever associated with this element is arranged to rest on one of the flat faces of the flat bar 25, so that said bar will be prevented from rotation in its supporting brackets.

The intermediate element consists of a plurality of longitudinally extending parallel bars 26 connected together at their ends by the strips 27, the ends of the intermediate bar being formed with trunnions for engagement in the appropriate depending brackets, shown at 16. A central transverse strip connects the intermediate portions of the bars 26, and on this strip the foot of the appropriate lever is arranged to engage to hold the element against rotation.

The rearmost of the ground treating elements consists of a flat board or strip of metal having the trunnions engaged in the brackets 12, as shown, the foot of the rear lever being arranged to rest on one of the flat faces of said strip to hold the same against rotation, as will be readily understood.

It will be noted that the foot of each of the levers is so formed that by tilting or swinging the lever to different degrees the ground treating device can be held at different angles with respect to the ground.

In the operation of the machine, the driver sets the ground treating elements to the proper angle with respect to the ground and then swings the levers so that the feet thereof will engage the said ground treating elements and hold them at such angles. Should trash accumulate on the elements, the levers are swung so as to disengage their feet from the elements when said elements will rotate by contact with the ground and thus throw off the accumulated trash.

What is claimed is:

1. In a land drag, a frame, depending brackets carried by the frame, a ground treating element mounted in the brackets for rotatable movement, said element having opposite flat faces, and a pivoted lever mounted on the frame and having an angularly directed foot on its lower end for movement into different angles to engage with one of the faces of the element when such element is moved to different angular positions around its axis to maintain said element in such angular positions.

2. In a land drag, a frame, depending bearing brackets carried by the ends of the frame, a ground treating element mounted in the brackets for rotatable adjustment and having upper and lower flat faces, a vertical lever pivotally supported on the frame and arranged to be set in different angular positions and having an angular foot on its lower end for alternate engagement with the flat faces of the said element to hold the element at different angles with respect to the ground.

In testimony whereof, I affix my signature, in the presence of two witnesses.

CHARLES A. MATHENY.

Witnesses:
J. M. D. ELMAN,
STELLA WOODY.